US012453653B2

(12) United States Patent
Curry et al.

(10) Patent No.: US 12,453,653 B2
(45) Date of Patent: Oct. 28, 2025

(54) MATERIALS AND METHODS FOR PUNCTAL PLUGS

(71) Applicant: GLAUKOS CORPORATION, San Clemente, CA (US)

(72) Inventors: Kenneth Curry, Oceanside, CA (US); William Tran, San Clemente, CA (US)

(73) Assignee: GLAUKOS CORPORATION, San Clemente, CA (US)

( * ) Notice: Subject to any disclaimer, the term of this patent is extended or adjusted under 35 U.S.C. 154(b) by 670 days.

(21) Appl. No.: 17/663,272

(22) Filed: May 13, 2022

(65) Prior Publication Data
US 2022/0362055 A1    Nov. 17, 2022

Related U.S. Application Data

(60) Provisional application No. 63/188,733, filed on May 14, 2021.

(51) Int. Cl.
*A61F 9/00* (2006.01)
*C08L 1/28* (2006.01)
*C08L 5/08* (2006.01)

(52) U.S. Cl.
CPC ............ *A61F 9/0017* (2013.01); *C08L 1/286* (2013.01); *C08L 5/08* (2013.01)

(58) Field of Classification Search
None
See application file for complete search history.

(56) References Cited

U.S. PATENT DOCUMENTS

| 4,959,048 | A | | 9/1990 | Seder et al. |
| 5,395,618 | A | * | 3/1995 | Darougar ............ A61K 9/0051 424/428 |
| 2004/0141151 | A1 | * | 7/2004 | Gillespie ............ A61F 9/00772 351/200 |
| 2005/0232972 | A1 | | 10/2005 | Odrich |
| 2007/0298075 | A1 | * | 12/2007 | Borgia ............... A61M 31/002 424/428 |
| 2008/0038317 | A1 | | 2/2008 | Chang et al. |
| 2010/0114309 | A1 | * | 5/2010 | de Juan, Jr. ......... A61F 9/00772 623/6.62 |
| 2010/0209477 | A1 | | 8/2010 | Butuner et al. |
| 2010/0256557 | A1 | | 10/2010 | Lust et al. |

(Continued)

FOREIGN PATENT DOCUMENTS

| WO | 2007149832 A2 | 12/2007 |
| WO | 2021071975 A1 | 4/2021 |

OTHER PUBLICATIONS

Merriam Webster (Merriam-Webster Dictionary, definition of "monolithic," accessed at https://www.merriam-webster.com/dictionary/monolithic#:~:text=1,an%20influential%20monolithic%20organization, on Apr. 30, 2025; hereinafter, "Merriam-Webster"). (Year: 2025).*

(Continued)

*Primary Examiner* — Dominic Lazaro
(74) *Attorney, Agent, or Firm* — K&L Gates LLP

(57) ABSTRACT

A punctum plug or lacrimal insert is constructed of a monolithic material, such that the punctum plug is configured to turn approximately 90 degrees upon insertion into a canaliculus of an eye. The punctum plug or lacrimal insert may include high-molecular-weight polysaccharide and added plasticizers.

22 Claims, 4 Drawing Sheets

(56) References Cited

U.S. PATENT DOCUMENTS

2018/0092836 A1\* 4/2018 Utkhede ............... A61K 9/146

OTHER PUBLICATIONS

International Search Report and Written Opinion for related International Application No. PCT/US22/29272; action dated Aug. 3, 2022; (9 pages).
Unknown; "Anatomy, Physiology, and Immunology of the Lacrimal System"; May 26, 2017; https://entokey.com/anatomy-physiology-and-immunology-of-the-lacrimal-system/; (8 pages).

\* cited by examiner

MATERIALS AND METHODS FOR PUNCTAL PLUGS

PRIORITY CLAIM AND CROSS-REFERENCE TO RELATED APPLICATIONS

This application claims priority to and benefit of U.S. Provisional Application No. 63/188,733, filed May 14, 2021, entitled "MATERIALS AND METHODS FOR PUNCTAL PLUGS", the entire contents of which are hereby incorporated by reference in their entirety including all tables, figures, and claims, and relied upon.

BACKGROUND

Field

This disclosure relates to medical and/or drug delivery devices structured to provide retention of tears and/or controlled release of a drug or non-active molecule to a desired ocular target tissue, and related methods of using such devices for the treatment of ocular diseases and disorders. In certain embodiments, this disclosure relates to devices for insertion into the canaliculus, via the punctum, and for delivery of a therapeutic agent or agents to the eye in a controlled manner via these devices.

Description of the Related Art

The mammalian eye is a specialized sensory organ capable of light reception and is able to receive visual images. The retina of the eye consists of photoreceptors that are sensitive to various levels of light, interneurons that relay signals from the photoreceptors to the retinal ganglion cells, which transmit the light-induced signals to the brain. The iris is an intraocular membrane that is involved in controlling the amount of light reaching the retina. The iris consists of two layers (arranged from anterior to posterior), the pigmented fibrovascular tissue known as a stroma and pigmented epithelial cells. The stroma connects a sphincter muscle (sphincter pupillae), which contracts the pupil, and a set of dilator muscles (dilator pupillae) which open it. The pigmented epithelial cells block light from passing through the iris and thereby restrict light passage to the pupil.

Within the eyelid resides a drainage duct for tears produced by the lacrimal glands. The portion of the drainage duct immediately following the lacrimal point, or lacrimal opening, is the lacrimal punctum. One lacrimal punctum exists in each upper and lower eyelid. Each punctum consists of an L-shaped aperture ~0.5 mm in diameter, lined with nonkeratinizing squamous epithelium surrounded by fibrous tissue.

Numerous pathologies can compromise or entirely eliminate an individual's ability to perceive visual images, including trauma to the eye, infection, degeneration, vascular irregularities, and inflammatory problems. The central portion of the retina is known as the macula. The macula, which is responsible for central vision, fine visualization and color differentiation, may be affected by age related macular degeneration (wet or dry), diabetic macular edema, idiopathic choroidal neovascularization, or high myopia macular degeneration, among other pathologies.

The cornea, lacrimal glands, mucous cells, and Meibomian glands are all richly innervated. Parasympathetic, sympathetic and sensory innervation play complex stimulatory or inhibitory roles, and neuronal pathways interact via complex surface results cascades. Abnormalities at any point in these pathways can cause overall dysregulation of lacrimal function. These abnormalities can result in a condition known as dry eye, keratoconjunctivis sicca of keratitis sicca, which is characterized by discomfort, visual disturbance and tear film instability with potential damage to the ocular surface. Allergic conjunctivitis is another condition affected by the interaction of eye tissues, typically resulting from histamine release by mast cells, and characterized by redness, swelling of the conjunctiva, itching and increased production of tears.

Other pathologies, such as abnormalities in intraocular pressure, can affect vision as well. Aqueous humor is a transparent liquid that fills at least the region between the cornea, at the front of the eye, and the lens and is responsible for producing a pressure within the ocular cavity. Normal intraocular pressure is maintained by drainage of aqueous humor from the anterior chamber by way of a trabecular meshwork which is located in an anterior chamber angle, lying between the iris and the cornea or by way of the "uveoscleral outflow pathway." The "uveoscleral outflow pathway" is the space or passageway whereby aqueous exits the eye by passing through the ciliary muscle bundles located in the angle of the anterior chamber and into the tissue planes between the choroid and the sclera, which extend posteriorly to the optic nerve. About two percent of people in the United States have glaucoma, which is a group of eye diseases encompassing a broad spectrum of clinical presentations and etiologies but unified by increased intraocular pressure. Glaucoma causes pathological changes in the optic nerve, visible on the optic disk, and it causes corresponding visual field loss, which can result in blindness if untreated. Increased intraocular pressure is the only risk factor associated with glaucoma that can be treated, thus lowering intraocular pressure is the major treatment goal in all glaucomas, and can be achieved by drug therapy, surgical therapy, or combinations thereof.

Many pathologies of the eye progress due to the difficulty in administering therapeutic agents to the eye in sufficient quantities and/or duration necessary to ameliorate symptoms of the pathology. Often, uptake and processing of the drug component of the therapeutic agent occurs prior to the drug reaching an ocular target site. Due to this metabolism, systemic administration may require undesirably high concentrations of the drug to reach therapeutic levels at an ocular target site. This can not only be impractical or expensive, but may also result in a higher incidence of side effects. Topical administration is potentially limited by limited diffusion across the cornea, or dilution of a topically applied drug by tear-action. Even those drugs that cross the cornea may be unacceptably depleted from the eye by the flow of ocular fluids and transfer into the general circulation. Thus, a means for ocular administration of a therapeutic agent in a controlled and targeted fashion would address the limitations of other delivery routes.

Current treatments for pathologies of the eye involve a number of treatments or combinations thereof, in particular but not limited to artificial tears, pharmaceutical agents (mast cell stabilizer, immunosuppressant, corticosterioid, etc.), Meibomian gland expression, warm compresses, or punctal plugs. Problematically, existing punctal plugs are short (e.g., 2-2.5 mm) so as to avoid any anatomical "bends" or "turns" within the canaliculus. Furthermore, existing punctal plugs are permanent devices, which can lead to clogging and require removal at a later date. Topical pharmaceutical agents can also be used to treat allergic conjunctivitis, in particular anti-histamines, NASIDs and corticosteroids. These treatments require frequent application of pharmaceutical agents to the eye by the patients, which can add drug burden and other life restrictions for the patient. A long-term drug delivery solution would alleviate this burden.

SUMMARY

In several embodiments, the devices disclosed herein operate to provide a therapeutic effect in the eye of a subject. The devices comprise a punctum plug or lacrimal insert, providing for tear retention and/or controlled delivery of drugs or other non-active molecules to the tear film. Advantageously, the devices disclosed herein are both long and flexible, so as to be inserted past an anatomical "bend" or "turn" within the canaliculus. Additionally, the devices disclosed herein are fully erodible.

In light of the disclosure herein, and without limiting the scope of the invention in any way, in a first aspect of the present disclosure, which may be combined with any other aspect listed herein unless specified otherwise, a punctum plug is constructed of a monolithic material. The punctum plug is configured to turn approximately 90 degrees upon insertion into a canaliculus of an eye.

In a second aspect of the present disclosure, which may be combined with any other aspect listed herein unless specified otherwise, a length of the punctum plug is greater than 5 mm.

In a third aspect of the present disclosure, which may be combined with any other aspect listed herein unless specified otherwise, a diameter of the punctum plug is greater than 0.2 mm and less than 1.0 mm.

In a fourth aspect of the present disclosure, which may be combined with any other aspect listed herein unless specified otherwise, the monolithic material is erodible in water.

In a fifth aspect of the present disclosure, which may be combined with any other aspect listed herein unless specified otherwise, the monolithic material is erodible and configured to be flushed out a nasal passage for removal.

In a sixth aspect of the present disclosure, which may be combined with any other aspect listed herein unless specified otherwise, the punctum plug comprises of at least 50% by weight of a high-molecular-weight polysaccharide.

In a seventh aspect of the present disclosure, which may be combined with any other aspect listed herein unless specified otherwise, a punctum plug is constructed of a high-molecular-weight polysaccharide and added plasticizers.

In an eighth aspect of the present disclosure, which may be combined with any other aspect listed herein unless specified otherwise, the high-molecular-weight polysaccharide is hydroxypropyl methyl cellulose.

In a ninth aspect of the present disclosure, which may be combined with any other aspect listed herein unless specified otherwise, the high-molecular-weight polysaccharide is carboxymethyl cellulose.

In a tenth aspect of the present disclosure, which may be combined with any other aspect listed herein unless specified otherwise, the high-molecular-weight polysaccharide is hyaluronic acid.

In an eleventh aspect of the present disclosure, which may be combined with any other aspect listed herein unless specified otherwise, the added plasticizers include one or more of glycerin, polyethylene glycol 6000, stearic acid, lauric acid, and dimyristoylphosphatidylglycerol.

In a twelfth aspect of the present disclosure, which may be combined with any other aspect listed herein unless specified otherwise, the punctum plug comprises a fluorescent moiety to improve visibility of the punctum plug during insertion.

In a thirteenth aspect of the present disclosure, which may be combined with any other aspect listed herein unless specified otherwise, the punctum plug comprises a fluorescent moiety to enable en situ visualization for the duration of the punctum plug.

In a fourteenth aspect of the present disclosure, which may be combined with any other aspect listed herein unless specified otherwise, the punctum plug is configured to retain tear film in the eye. The punctum plug is comprised entirely of materials suitable for formulation into lubricating eye drops, and wherein the materials slowly erode into the tear film.

In a fifteenth aspect of the present disclosure, which may be combined with any other aspect listed herein unless specified otherwise, the punctum plug is constructed of an erodible monolithic material, and wherein the punctum plug is configured to be inserted into a canaliculus of an eye.

In a sixteenth aspect of the present disclosure, which may be combined with any other aspect listed herein unless specified otherwise, a length of the punctum plug is greater than 5 mm.

In a seventeenth aspect of the present disclosure, which may be combined with any other aspect listed herein unless specified otherwise, a diameter of the punctum plug is greater than 0.2 mm and less than 1.0 mm.

In an eighteenth aspect of the present disclosure, which may be combined with any other aspect listed herein unless specified otherwise, the monolithic material is erodible and configured to be flushed out a nasal passage for removal.

In an nineteenth aspect of the present disclosure, which may be combined with any other aspect listed herein unless specified otherwise, the punctum plug comprises at least 50% by weight of a high-molecular-weight polysaccharide.

In a twentieth aspect of the present disclosure, which may be combined with any other aspect listed herein unless specified otherwise, the punctum plug is constructed of a high-molecular-weight polysaccharide and added plasticizers. The high-molecular-weight polysaccharide is one of hydroxypropyl methyl cellulose, carboxymethyl cellulose, and hyaluronic acid.

Additional features and advantages of the disclosed devices, systems, and methods are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not necessarily have to have all of the advantages listed herein. Moreover, it should be noted that the language used in the specification has been selected for readability and instructional purposes, and not to limit the scope of the inventive subject matter.

BRIEF DESCRIPTION OF THE DRAWINGS

These and other features, aspects, and advantages of the present disclosure will now be described with reference to the drawings of embodiments, which embodiments are intended to illustrate and not to limit the disclosure. One of ordinary skill in the art would readily appreciated that the features depicted in the illustrative embodiments are capable of combination in manners that are not explicitly depicted, but are both envisioned and disclosed herein.

DETAILED DESCRIPTION

Achieving local ocular administration of a drug may require direct injection or application, but could also include the use of a drug releasing device, a portion of which, could be positioned in close proximity to the target site of action within the eye or within the chamber of the eye where the target site is located, such as the anterior chamber, posterior chamber, or both simultaneously. Use of a drug releasing device could also allow the targeted delivery of a drug to a specific ocular tissue, such as, for example, the macula, the retina, the ciliary body, the optic nerve, or the vascular supply to certain regions of the eye. Use of a drug releasing device could also provide the opportunity to administer a controlled amount of drug for a desired amount of time, depending on the pathology.

As used herein, "patient" shall be given its ordinary meaning and shall also refer to mammals generally. The term "mammal", in turn, includes, but is not limited to, humans, dogs, cats, rabbits, rodents, swine, ovine, and primates, among others. Additionally, throughout the specification ranges of values are given along with lists of values for a particular parameter. In these instances, it should be noted that such disclosure includes not only the values listed, but also ranges of values that include whole and fractional values between any two of the listed values.

As used herein, "drug" refers generally to one or more drugs that may be administered alone, in combination and/or compounded with one or more pharmaceutically acceptable excipients, such as binders, disintegrants, fillers, diluents, lubricants, drug release control polymers or other agents, or the like, auxiliary agents or compounds as may be housed within the devices as described herein. The term "drug" is a broad term that may be used interchangeably with "therapeutic agent" and "pharmaceutical" or "pharmacological agent" and includes not only so-called small molecule drugs, but also macromolecular drugs, and biologics, including but not limited to proteins, nucleic acids, antibodies and the like, regardless of whether such drug is natural, synthetic, or recombinant. Drug may refer to the drug alone or in combination with the excipients described above. "Drug" may also refer to an active drug or a prodrug or salt of an active drug. When the drug is in the device, it may be referred to as a "drug load" or "drug" and it is to be understood that these terms are interchangeable.

Dry Eye Disease Treatment

Figure 1:
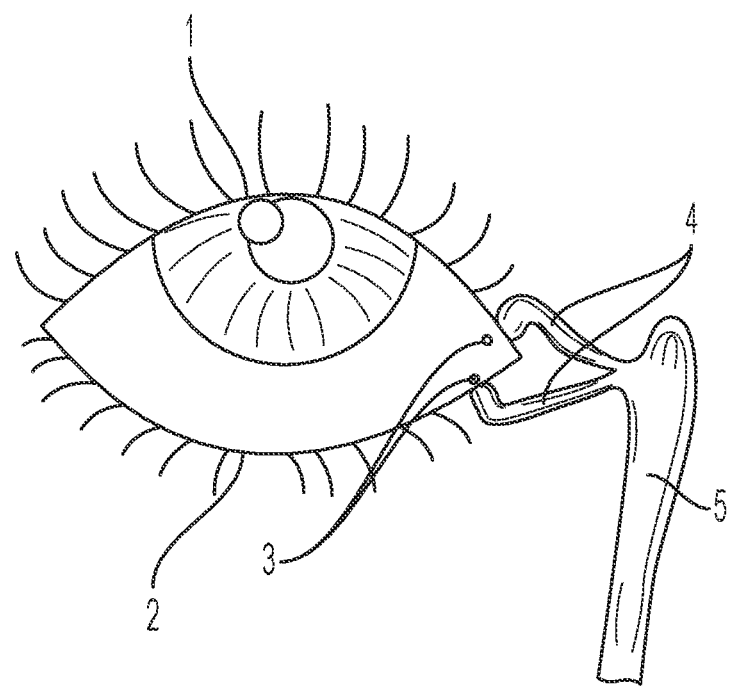
FIGS. 1 and 1A illustrate a typical ocular environment, in accordance with embodiments disclosed herein.
Figure 1A:
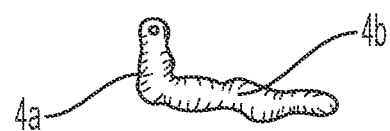

Referring now to the Figures, FIGS. 1 and 1A illustrate a typical ocular environment. Namely, anatomical features of the ocular environment include an upper eye lid 1 and a lower eye lid 2. The eye further includes upper and lower puncta 3 and upper and lower lacrimal ducts 4 communicating with the respective puncta 3. The lower lacrimal duct 4 (also commonly referred to as a canal) is typically shaped as a proximal 2 mm long canal 4a descending from the lower punctum 3. This lacrimal duct 4 makes a right-angle turn and continues as a distal canal 4b of approximately 8 mm that connects the canal to the naso-lacrimal duct 5.

One such condition, associated with the lacrimal duct 4 and related anatomy, is called Dry Eye Disease (DED). DED is an ocular condition recognized as a disturbance of the lacrimal system including lacrimal glands, lacrimal ducts, cornea, conjunctiva and Meibomian glands. The symptoms of DED include redness, burning, reflex tearing, itching, and foreign body sensation. DED severity is typically graded into categories, from one to four: one being mild, two being moderate, three being severe, and four being disabling or constant.

For mild to moderate DED, the symptoms can be moderated by use of over-the-counter lubricating eye drops, which are applied on an as-needed basis. These solutions are typically comprised of a high molecular weight (HMW) polysaccharide such as hydroxypropyl methyl cellulose (HPMC), carboxymethyl cellulose (CMC), or hyaluronic acid (HA). These HMW cellulosic materials bind to the corneal surface which contains mucin. Over-the Counter (OTC) lubricating eye drops also typically contain an emollient or humectant ingredient such as glycerin. Finally, lubricating drops may also contain a lipid mimicking compound such as dimyristoyl phosphatidylglycerol. These molecules can act as a tear surface modifier and help to prevent tear film evaporation. While OTC drops are useful, they must be re-applied frequently to ameliorate moderate dry eye symptoms.

Figure 2:
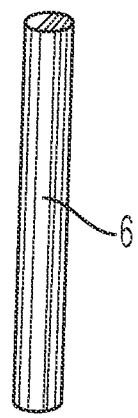
FIGS. 2 and 2A illustrate a straight and a bent cylindrical punctum plug before and after insertion into an eye, in accordance with embodiments disclosed herein.
Figure 2A:
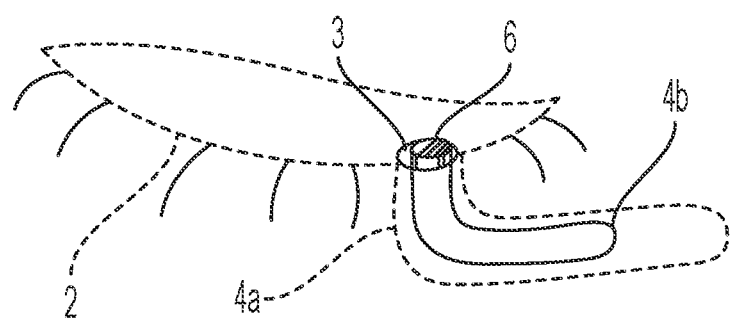

In addition to lubricating eye drops, punctal plug devices can also be used for mild to moderate dry eye symptoms. An exemplary device is illustrated by FIGS. 2 and 2A. These devices are inserted into the punctum 3 and reside at the margin of the lower lid 2. The devices are inserted part-way into the upper portion of the canaliculus 4a. Once in place, the devices block naturally occurring tears from draining out the canaliculus to the naso-lacrimal duct 5. Punctal plugs are also indicated for use for increasing retention and enhancement of medications in eye drops.

In a preferred embodiments, devices such as plug 6 treat mild to moderate dry eye symptoms by retaining tear film, while simultaneously releasing ingredients such as mucin binding polymers, emollients, and lipid mimicking biomolecules to alleviate related symptoms of dry eye disease.

Specifically, the device described herein and illustrated by FIG. 2 is a cylindrical punctum plug 6, approximately 0.5 mm in diameter and 6 mm in length. It should be appreciated, however, that alternate diameters and lengths are contemplated herein. For example, punctum plugs can have lengths of up to about 1 mm, up to about 2 mm, up to about 3 mm, up to about 4 mm, up to about 5 mm, up to about 6 mm, up to about 7 mm, up to about 8 mm, up to about 9 mm, or up 10 mm or longer. As will be appreciated, longer plugs may include higher quantities of drugs and related ingredients, due to larger total volumes. Furthermore, is should be appreciated that while the disclosure herein primarily refers to punctum plugs (e.g., punctum plug 6), these devices may additionally or alternatively be referred to as lacrimal inserts.

In several embodiments the size of the plug 6 may optionally vary, depending on the patient. In other embodiments, the plug 6 is designed as a "one size fits all patients" device that may more readily conform to various sized puncta. For example, swellable plugs 6 disclosed herein can be readily inserted into a variety of different puncta 3. In several embodiments, the plug 6 is designed to fit in either the left or right eye.

It should be appreciated that plug 6 is configured to be inserted into the lacrimal duct 4 of the eye, via the punctum 3, as illustrated by FIG. 2A. In certain embodiments, the plug 6 can be placed into the patient by a non-surgical procedure. Also, this delivery scheme easily replicates the release pharmaco-kinetics known to be useful from eye-drops. Specifically, the plug 6 is an ideal platform for therapeutic delivery to the eye under chromic conditions such as dry eye, for example. It may also be useful for long-term therapy such as atropine for myopia progression treatment in children because of its ease of replacement and relatively large-size compared to other ocular delivery platforms. FIG. 2A thus illustrates a schematic view of an enlarged view of the anatomy of a patient's eye and the insertion of the plug 6 in the lacrimal duct 4 of the patient's eye. As illustrated, plug 6 is configured to make approximately a 90 degree turn or bend, upon insertion into the lacrimal duct 4 of an eye.

Device Composition and Construction

Generally speaking, the plug 6 is constructed via a hot-melt extrusion process. Specifically, plug 6 is a homogenous monolithic filament that remains flexible at room temperature. Once plug 6 undergoes hydration with tear film, flexibility changes and plug 6 erodes. Generally, by being erodible, plug 6 is configured for one-time use, thus avoiding certain risks with permanent plugs such as infection, granuloma, and related safety issues such as over-insertion and subsequently surgical removal. In an embodiment, plug 6 includes a monolithic material that is erodible in water. In a related embodiment, the water is tear fluid. Plug 6 may also be configured such that it can be flushed out of a nasal passage (after erosion) for removal from the canaliculus.

Figure 3:
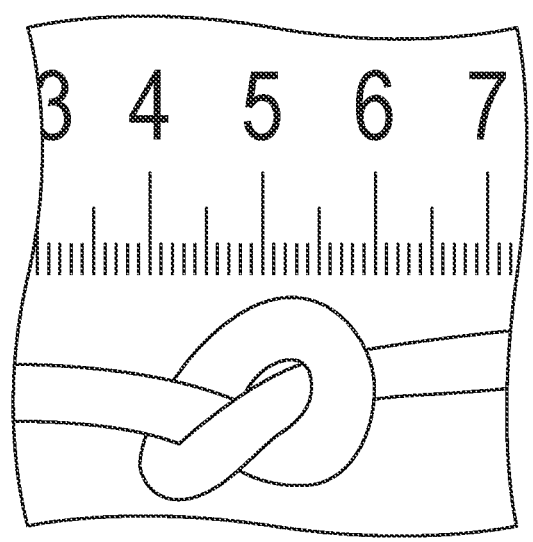
FIG. 3 illustrates a knotted cylindrical punctum plug with colored moeity, in accordance with the embodiments disclosed herein.

In an embodiment, plug 6 has sufficient strength and flexibility to sustain knotting, as illustrated by FIG. 3. As depicted in FIG. 3, plug 6 has flexibility such that the entire knot has a dimension of approximately 2 mm; this knotted dimension demonstrates that plug 6 has the necessary flexibility and strength in the anatomical dimensions required to pass from the proximal portion of the canaliculus 4a to the distal portion of the canaliculus 4b. For example, plug 6 makes an approximately 90 degree turn or bend as it passes from the proximal portion of the canaliculus 4a to the distal portion of the canaliculus 4b.

In an embodiment, the bulk materials of the hot-melt extrusion are water soluble polymers including, for example, the family of high-molecular weight polysaccharides. In a particular embodiment, the high-molecular-weight polysaccharide is hydroxypropyl methyl cellulose.

Generally, erodibility is conferred by taking a polysaccharide, and plasticizing it such that it becomes flexible. These water soluble polymers are mixed with low-molecular weight wetting and non-wetting agents, which advantageously add plasticity upon hot-melt extrusion. In an embodiment, the monolithic material includes added plasticizers. In a related embodiment, the added plasticizers include one or more of glycerin, polyethylene glycol 6000, stearic acid, lauric acid, and dimyristoylphosphatidylglycerol.

These additives may also modify the rate of erosion of the plug 6. For example, by adding lipophilic waxy additives, the rate of water uptake in the plug 6 is slowed down, which changes the behavior and longevity of the plug 6 in the canaliculus.

In an embodiment, the materials used for constructing plug 6 are first blended and mixed, such as by hand or using commercial equipment, until the materials are a homogeneous mixture. This homogeneous mixture is added to an extrusion apparatus, which is capable of heating the homogeneous mixture to approximately 160 to 220 degrees Celsius. Upon heating, the materials combine in a uniform way, and the plasticizer components wet-out and combine with the bulk polymer components. The additives are also melted into the mixture at time of extrusion. In certain embodiments, to improve visualization for insertion into the eye, a D&C green No. 6 moeity or dye is added at up to 0.05% concentration. This moeity gives the plug 6 a blue appearance, as shown in the knot of FIG. 3. In another related embodiment, D&C violet No. 20 moeity is added, to give the plug 6 a purple appearance.

In an embodiment, the fluorescent moeity improves visibility of the punctum plug during insertion. In an embodiment, the fluorescent moiety enables en situ visualization for the duration of the punctum plug. It should be appreciated that the fluorescent moiety could take the form of a small molecule that is added into the formulation at the time of processing. Additionally or alternatively, the moiety could take the form of a pendant group conjugated to a larger polysaccharide for example.

Material is then extruded into a cylindrical filament-like rod, or other related shape.

The material is allowed to return to room temperature after extrusion, which results in a long flexible filament-like rod. This filament has a fixed diameter, which could be in the range of 0.2 to 0.8 millimeters. The filament is cut to length, which could be from 2 to 10 mm in length, forming plug 6. This plug 6 is packaged and terminally sterilized with common sterilization methods such as gamma irradiation, ETO gas, autoclaving, or other related sterilization methods.

Once packaged and sterilized, plug 6 is ready for insertion.

Device Insertion and Use

Specifically, once the plug 6 is constructed, the resulting extruded material is flexible at room temperature, even prior to hydration; this flexibility allows the plug 6 to be pushed pass the anatomical angle in the canaliculus (illustrated by FIG. 2A) to bend and flex. At the same time, plug 6 maintains sufficient tensile strength and stiffness to be inserted with channeled forceps, which is a common method of insertion, or to be inserted manually. In a particular embodiment, plug 6 is longer than 5 mm in length and, upon insertion into a canaliculus of an eye, is capable of making a 90 degree turn or bend. Generally speaking, longer length plugs provide for improved retention, due to more surface area associated with more length. Longer length plugs also provide for improve duration of action, due to a longer length of material requiring erosion.

Figure 4:
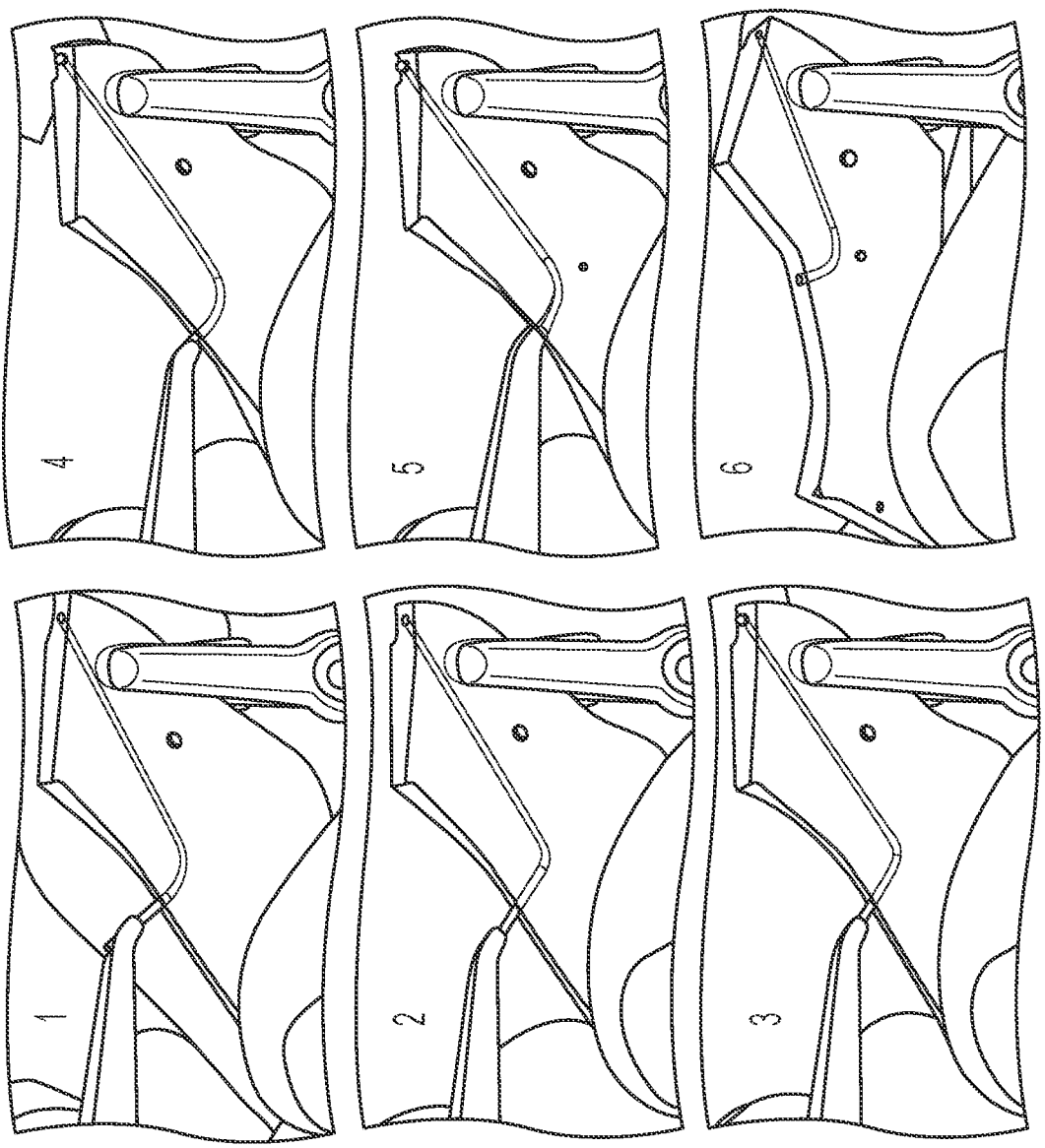
FIG. 4 illustrates insertion of a cylindrical punctum plug into a bent passageway, in accordance with the embodiments disclosed herein.

The progression of plug 6 from straight to anatomical turn is further illustrated by FIG. 4. Namely, in slide 1 of FIG. 4, the plug 6 is gripped in channeled forceps and introduced into the lower punctum 3. Alternatively, plug 6 could be manually introduced into the lower punctum 3. In slides 2 and 3, the plug 6 advances into the proximal portion of the canaliculus 4a. In slide 4, the plug 6 has started the anatomical turn into the distal portion of the canaliculus 4b. In slide 5, the plug 6 is further advanced. In slide 6, the plug 6 has been fully inserted past the punctum.

For example, in an embodiment, plug 6 is approximately 10 mm in length. In this embodiment, when inserted, a proximal end of plug 6 (e.g., 2 mm of the 10 mm plug 6) is disposed in the proximal portion of the canaliculus 4a; similarly, when inserted, a distal end of plug 6 (e.g., 8 mm of the 10 mm plug 6) is disposed in the distal portion of the canaliculus 4b.

Upon hydration, the plug 6 becomes a gelatinous mass, which swells slightly to ensure retention within the canaliculus. This gelatinous mass is also form fitting, which results in better comfort for the patient. Advantageously, by swelling, plug 6 allows for a one-size-fits-all approach; swelling plugs simplify sizing requirements for patients and do not require use of retention features to ensure that the plug 6 remains in place after insertion. The gelatinous mass is fully erodible, and is flushable once fully hydrated, ensuring ease and safety of removal by irrigation out the nasal passage, such as via saline irrigation.

In experimental results, to demonstrate that plug 6 completely disintegrates in aqueous solution, three plugs 6 were put into individual vials of saline buffer and placed in 37 degree Celsius water bath. The plugs 6 were observed to swell and completely disintegrate after several days. The buffer of each vial were subsequently tested for percent composition of HPMC, by gel-permeation chromatography with refractive index detector. The samples recovered at 92%, 105%, and 88% for an average of 95% recovery. This demonstrates that the bulk polymer HPMC had dissolved in the buffer.

It should be appreciated that plug 6 is generally biodegradable or bioerodible. This biodegradable plug 6 may include any suitable material including, but not limited to, poly(lactic acid), polyethylene-vinyl acetate, poly(lactic-co-glycolic acid), poly(D,L-lactide), poly(D,L-lactide-co-trimethylene carbonate), collagen, heparinized collagen, poly(caprolactone), poly(glycolic acid), and/or other polymer or copolymer.

In some embodiments, the plug 6 comprises a polymer with drug distributed or dispersed throughout. Detailed methods for incorporating drugs or prodrugs into polymer matrices are disclosed in U.S. Pat. No. 8,628,792, WO 2009/035565, and US 2013/0172268, the disclosures of which are incorporated herein by reference in their entireties. The distribution of drug within the polymer could be homogeneous, such as would be obtained by stirring or agitating powdered or liquid drug with a soft or flowable form of a thermoplastic polymer (such as polyurethane); or by stirring or agitating powdered or liquid drug with a pre-polymer form of a thermoset polymer (such as polydimethylsiloxane or other silicones) or hydrogel (such as polyacrylamide).

In some embodiments, the drug load associated with plug 6 provide an initial elution range of 1 µg per day, 2 µg per day, 3 µg per day, 4 µg per day, 5 µg per day, 6 µg per day, 7 µg per day, 8 µg per day, 9 µg per day, 10 µg per day. In some examples, the drug load can include drug elution rates from at least 1 µg to about 5 µg per day, from about 5 µg to about 10 µg per day, from about 2 µg to about 4 µg per day, from about 4 µg to about 6 µg per day, from about 6 µg to about 8 µg per day, from about 8 µg to about 10 µg per day, from about 3 µg to about 8 µg per day. In some embodiments, the drug load can include drug elution rates ranging from drug elution rates of 0.2 µg per day, 0.3 µg per day, 0.4 µg per day, 0.5 µg per day, 0.6 µg per day, 0.7 µg per day, 0.8 µg per day, 1.0 µg per day, 1.1 µg per day, 1.2 µg per day, 1.3 µg per day, 1.4 µg per day, 1.5 µg per day, 1.6 µg per day, 1.7 µg per day, 1.8 µg per day, 1.9 µg per day, 2.0 µg per day, 2.1 µg per day, 2.2 µg per day, 2.3 µg per day, 2.4 µg per day, 2.5 µg per day, 2.6 µg per day, 2.7 µg per day, 2.8 µg per day, 2.9 µg per day, 3.0 µg per day, 3.1 µg per day, 3.2 µg per day, 3.3 µg per day, 3.4 µg per day, 3.5 µg per day, 3.6 µg per day, 3.7 µg per day, 3.8 µg per day, 3.9 µg per day, 4.0 µg per day, 4.1 µg per day, 4.2 µg per day, 4.3 µg per day, 4.4 µg per day, 4.5 µg per day, and from about 0.2 µg per day to about 0.8 µg per day, from about 0.8 µg per day to about 1.0 µg per day to about 1.5 µg per day, from about 1.5 µg per day to about 2.0 µg per day, from about 2.0 µg per day to about 2.5 µg per day, from about 2.5 µg per day to about 3.0 µg per day, from about 3.0 µg per day to about 3.5 µg per day, from about 3.5 µg per day to about 4.0 µg per day, from about 4.0 µg per day to about 4.5 µg per day.

It will be understood that embodiments as described herein may include a drug mixed or compounded with a biodegradable material, excipient, polymer, or other agent modifying the release characteristics of the drug to form a solid or soft solid, such as paste, gel, or the like, that may be referred to herein as a formulation or drug formulation or drug load. A drug formulation or other form of drug may be loaded into a device directly.

In some embodiments, the plug 6 can contain a plurality of active pharmaceutical ingredients ("API"). In some examples, the lacrimal insert 6 can be configured to contain two pharmaceutical agents providing an initial release of corticosteroid, such as loteprednol etabonate and sustained release of an immunosuppressant, such as cyclosporine A.

In several embodiments, such materials include biodegradable or bioerodible copolymers of lactic acid and glycolic acid, also known as poly (lactic-co-glycolic acid) or PLGA. It will be understood by one skilled in the art that although some disclosure herein specifically describes use of PLGA, other suitable biodegradable materials may be substituted for PLGA or used in combination with PLGA in such embodiments.

It may be desirable, in some embodiments, to provide for a particular rate of release of drug from a PLGA copolymer, other polymeric material, or other excipient. As the release rate of a drug from a polymer correlates with the degradation rate of that polymer, control of the degradation rate provides a means for control of the delivery rate of the drug contained within the therapeutic agent. Variation of the average molecular weight of the polymer or copolymer chains, which make up the PLGA copolymer or other polymer may be used to control the degradation rate of the copolymer, thereby achieving a desired duration or other release profile of therapeutic agent delivery to the eye.

In certain other embodiments employing PLGA copolymers, rate of biodegradation of the PLGA copolymer may be controlled by varying the ratio of lactic acid to glycolic acid units in a copolymer.

Still other embodiments may utilize combinations of varying the average molecular weights of the constituents of the copolymer and varying the ratio of lactic acid to glycolic acid in the copolymer to achieve a desired biodegradation rate.

In some embodiments, the drug is compounded with one or more polymers to form a gel or paste that assists in determining the elution rate of the drug. Certain preferred formulations have one or more of three properties: high drug component density, and high overall density of the material; ability to be free flowing to facilitate filing of the device to prevent air gaps or other wasted space in the device, which may include thixotropic materials; flexible or malleable finished form of the drug after being placed in the device for designs that might flex in use or during insertion; and an ability to remain effective in delivering the drug even if the encapsulating polymer were to be ruptured, broken or otherwise damaged.

In several embodiments, the therapeutic agent is a protein, and in such embodiments, drying and/or tabletization should be completed under conditions, such as particular temperature, acid/base, and the like, that do not adversely affect the biological activity of the therapeutic agent. To assist in maintenance of biological activity of micro-pelleted therapeutic agents, in some embodiments, protein therapeutics are formulated with a stabilizing agent, such as mannitol, trehalose, starch, or other poly-hydroxy polymers, to maintain the structure (and therefore activity) of the therapeutic protein.

As mentioned above, depending on the embodiment, the drug or drugs to be administered via the drug delivery device may be in the form of a nanodispersion. Nanodispersions are particularly advantageous when the drug (or drugs) to be administered is poorly soluble or insoluble in aqueous solutions, which can lead to instability and/or reduced bioavailability.

As used herein, the term "nanodispersion" shall be given its ordinary meaning and shall refer to a composition comprising nanoparticles comprising a drug and/or an aqueous vehicle. In several embodiments, the aqueous vehicle comprises a water miscible solvent and water. In several embodiments, the nanoparticles may comprise a drug, a polymer and a surfactant comprising a mixture of fatty acids or its salts and sterol or its derivatives or its salts, in some embodiments.

The term "nanoparticle" as used herein shall be given its ordinary meaning and shall also refer to particles having controlled dimensions of the order of nanometers. For example the nanoparticles, in several embodiments, are a polymeric nanoparticle (formulation of polymer entrapping the drug) and/or a polymeric nanovesicle (polymer stabilized nano sized vesicle encapsulating the drug.) and/or a polymeric nanocapsule (polymeric membrane surrounding drug in core) and/or nano sized particles of the drug stabilized by surfactants, and the like the nanoparticles having mean size less than about 300 nm, such as ranging from about 10 nm to about 275 nm, or in the range of about 10 nm to about 200 nm.

In several embodiments, the water miscible solvent used in the nanodispersion comprises one or more of alcohols, glycols and its derivatives, polyalkylene glycols and its derivatives, glycerol, glycofurol and combinations thereof. Additional non-limiting examples include, but are not limited to, alcohols such as ethanol, n-propanol, isopropanol; glycols such as ethylene glycol, propylene glycol, butylene glycol and its derivatives; polyethylene glycols like PEG 400 or PEG 3350; polypropylene glycol and its derivatives such as PPG-10 butanediol, PPG-10 methyl glucose ether, PPG-20 methyl glucose ether, PPG-15 stearyl ether; glycerol; glycofurol and the like and mixtures thereof. In still additional embodiments, the non-aqueous solvent is selected from the group consisting of alcohols, polyethylene glycols and/or mixtures thereof, such as, for example, a mixture of ethanol and PEG (polyethylene glycol). In some embodiments, in which ethanol is used in the nanodispersion, ethanol is present in an amount ranging from about 0.001% w/v to about 5% w/v, more preferably from about 0.05% w/v to about 0.5% w/v and most preferably from about 0.1% w/v to about 0.25% w/v. Polyethylene glycols which are used preferably, include PEG-400 and PEG-3350. PEG-400 is used, depending on the embodiment, in an amount ranging from about 0.01% w/v to about 20.0% w/v, more preferably from about 0.05% w/v to about 5.0% w/v and most preferably from about 1.0% w/v to about 2.5% w/v. PEG-3350 is used, depending on the embodiment, in an amount ranging from about 0.001% w/v to about 10.0% w/v, more preferably from about 0.05% w/v to about 5.0% w/v and most preferably from about 0.1% w/v to about 3% w/v.

In some embodiments, the nanoparticles comprise one or more polymers. The polymer(s) used in several embodiments are preferably, water soluble. Polyvinylpyrrolidone, one such water soluble polymer used in several embodiments, is a tertiary amide polymer having linearly arranged monomer units of 1-vinyl-2-pyrrolidone. It has mean molecular weights ranging from about 10,000 to about 700,000. Other grades of polyvinylpyrrolidone are used in some embodiments, with molecular weights ranging from about 2000 to about 3000, about 7000 to about 11,000, about 28,000 to about 34,000, or about 1,000,000 to about 1,5000, 000. In still additional embodiments, polyvinylpyrrolidone use for the polymer have molecular weight in the range from about 1,000 to about 45,000, preferably, from about 4,000 to about 30,000. According several embodiments, the amount of polymer used in the nanodispersion ranges from about 0.001% w/v to about 20% w/v, including preferably about 0.01% w/v to about 5.0% w/v and also about 0.01% w/v to about 1.0% w/v.

Polyethylene glycol is used in several embodiments, either in addition or in place of polyvinylpyrrolidone. In several embodiments, the amount of polymer used in the nanodispersion ranges from about 0.001% w/v to about 20% w/v, including about 0.01% w/v to about 5.0% w/v, and in some embodiments, about 0.01% w/v to about 1.0% w/v.

Surfactants are used in some embodiments of the nanodispersions for drug(s). In several embodiments, the surfactants comprise a mixture of fatty acid or its salts and sterol or its derivatives or its salts.

As used herein, the term "fatty acids" shall be given its ordinary meaning and shall also include aliphatic (saturated or unsaturated) monocarboxylic acids derived from or contained in esterified form, in an animal or vegetable fat, oil or wax. Non-limiting examples of fatty acids (or its salts) that may be used in in several embodiments include, but are not limited to, fatty acids or its salts having 'n' number of carbon atoms wherein 'n' ranges from about 4 to about 28. The fatty acid may be a saturated fatty acid or an unsaturated fatty acid, and their salt and combinations thereof. Depending on the embodiment, the saturated fatty acid and its salts may be selected from butyric acid, caproic acid, caprylic acid, capric acid, lauric acid, myristic acid, palmitic acid, stearic acid, arachidic acid, behenic acid, sodium caprylate, sodium laurate, sodium myristate, sodium palmitate and the like and/or mixtures thereof. The unsaturated fatty acid and its salts may be selected from myristoleic acid, palmitoleic acid, oleic acid, linoleic acid, alpha linolenic acid, arachidonic acid, eicosapentaenoic acid, erucic acid, docosahexaenoic acid, sodium oleate, sodium arachidonate and the like and/or mixtures thereof.

Additionally, non-limiting examples, of sterol or its derivative or its salts that may be used in the nanodispersion or nanoparticles may be acid esters of sterols. The sterols that may be suitable, but are not limited to, cholesterol, phytosterols, ergosterol, bile acids salts and mixtures thereof. Acid salts of cholesterol that may be used include, but are not limited to, cholesteryl sulfate, cholesterol acetate, cholesterol chloroacetate, cholesterol benzoate, cholesterol myristate, cholesterol hemisuccinate, cholesterol phosphate, cholesterol phosphate, phosphonate, borate, nitrate, cholesterol cinnamate, cholesterol crotanoate, cholesterol butyrate, cholesterol heptanoate, cholesterol hexanoate, cholesterol octanoate, cholesterol nonanoate, cholesterol decanoate, cholesterol oleate, cholesterol propionate, cholesterol valerate, dicholesteryl carbonate and the like and mixtures thereof. Phytosterols that may be used in the compositions include sitosterol, campesterol, stigmasterol, brassicasterol and its derivatives, salts and mixture thereof. For example, Phytosterols marketed by Sigma, U.S.A. containing bsitosterol, campesterol and dihydrobrassicasterol. Bile acids include cholic acid, chenodeoxycholic acid, deoxycholic acid, glycocholic acid, taurocholic acid, ursodeoxycholic acid and its derivatives, salts and mixture thereof. The sterols can also be esters of cholesterol including cholesterol hemi-succinate, salts of cholesterol including cholesterol hydrogen sulfate and cholesterol sulfate, ergosterol, esters of ergosterol including ergosterol hemi-succinate, salts of ergosterol including ergosterol hydrogen sulfate and ergosterol sulfate, lanosterol, esters of lanosterol including lanosterol hemi-succinate, salts of lanosterol including lanosterol hydrogen sulfate and lanosterol sulfate.

According to one embodiment, the nanoparticles comprise a surfactant which is a mixture of sterol or its derivatives or its salts and fatty acids or its salts. In an additional embodiment, the nanoparticles comprised of cholesterol ester or polar acids. In still further embodiments, the surfactant used in the nanodispersion is a mixture of caprylic acid and cholesteryl sulfate. Caprylic acid, also known as octanoic acid may be used in such embodiments in an amount ranging from about 0.001% w/v to about 5.0% w/v, more preferably from about 0.01% w/v to about 1.0% w/v and most preferably from about 0.01% w/v to about 0.5% w/v. Cholesteryl sulfate is used in certain embodiments in an amount ranging from about 0.001% w/v to about 5.0% w/v, more preferably from about 0.01% w/v to about 1.0% w/v and most preferably from about 0.01% w/v to about 0.5% w/v. In one embodiment, the surfactant used is selected from oleic acid and cholesteryl sulphate and/or mixtures thereof. In some embodiments, the surfactant used is selected from saturated fatty acid and bile acid or bile salt and/or mixtures thereof. Bile salts, when used according to some embodiments, are present in an amount ranging from about 0.001% w/v to about 5.0% w/v, more preferably from about 0.01% w/v to about 1.0% w/v and most preferably from about 0.01% w/v to about 0.75% w/v. Other amounts may be used in conjunction with other embodiments disclosed herein. Nanodispersions can be generated by methods appreciated in the art, such as those methods (and the resulting nanodispersions) disclosed in U.S. Pat. No. 8,778,364, which is incorporated by reference in its entirety herein.

In addition, one or more of the therapeutic drug regions may comprise drug-cyclodextrin inclusion complexes; liposome encapsulation; micelles based on polymers such as polysaccharide, poly (ethylene glycol)-poly(lactide), methoxy poly(ethylene glycol)-poly(hexyl-lactide), or hydrophobically-modified hydroxypropylcellulose; nanoparticles of amorphous drug formed by antisolvent precipitation and stabilized with surfactant such as polysorbate 80 or polyoxyl 15 hydroxystearate; nanoparticles having a mean size less than 500 nm containing one or more drugs, a polymer, and a surfactant, where the surfactant may include a mixture of fatty acids or its salts and sterol or its deriviatives or its salts; drug co-processed or granulated with excipients such as microcrystalline cellulose, lactose, hydroxypropyl methyl cellulose, or povidone; added polyethylene glycol chains to the drug, polymer, or surfactant (PEGylation); solid dispersions in polymeric carriers such as hypromellose acetate succinate, copolymers based on dimethylaminoethyl methacrylate, butyl methacrylate, and methyl methacrylate, poly(vinylpyrrolidone-vinyl acetate), or lauroyl macrogolglycerides; or microspheres (for example, based on PLGA or chitosan).

The plug 6 can be formed from a composition of materials. The composition of materials can include, but are not limited to, a cellulosic or equivalent high-molecular weight polymer, a plasticizer for the high-molecular weight polymer, and a lipid-emulating small molecule.

Further, the plug 6 can be formulated to allow for sustained and/or gradual release. In some embodiments, this sustained and/or gradual release can be from erosion when exposed to aqueous fluids or media. In some embodiments, the sustained and/or gradual release can be for at least 1 day, at least 1 week, at least 1 month, at least 6 months, or at least 1 year.

The material properties that allow the plug 6 to flex can also allow the plug 6 to conform to a curved or bended shape. In some embodiments, even though the plug 6 is flexible, it can possess enough stiffness to be pushed into an opening. This combination of flexibility and push-ability makes the material properties unique unlike other lacrimal inserts that are initially quite stiff, but quickly become too soft to sustain pushing beyond a few millimeters. Therefore, the plugs described herein can be useful as stand-alone inserts, without the need for a tube or sleeve or other construction required to contain it.

Although the plug 6 can serve as a stand-alone insert, in some embodiments, it may be used in conjunction with a properly designed body to retain it in a particular location.

The plug's 6 material properties can include push-ability, flexibility, and when erosion is completed, ease of removal. In one embodiment, the chemical properties are such that materials that release upon erosion can be useful for the amelioration ocular conditions, such as but not limited to, dry eye. In some embodiments, the chemical properties are such that all materials that release upon erosion can be useful for the amelioration ocular conditions.

The composition of materials used to form the plug 6 can be entirely comprised of FDA over-the-counter (OTC) monograph ingredients for ophthalmic compositions, such as an OTC ocular drop. This use of OTC monograph ingredients is in contrast to typical drug delivery extrusions that use a polymer such as PLGA that is needed for the bulk properties but serves no clinical need.

In some embodiments, the polymer used to form the plug 6 can be an active ingredient, and thus, there is no wasted polymer used to scaffold and/or release an active ingredient(s). This polymer that can be an active ingredient, or not, can be a cellulose derivatives such as, but not limited to carboxymethylcellulose sodium, hydroxyethyl cellulose, hypromellose (hydroxypropyl methyl cellulose), methylcellulose. The polymer can also be polyvinyl alcohol (PVA), povidone (polyvinylpyrrolidone). In some embodiments, the polymer can also be hyaluronic acid, guar gum, or chondroitin sulfate.

In some embodiments, any number of these polymer can be combined.

In some embodiments, drugs can be formulated with a viscosity modifier. A viscosity modifier can be used to increase or decrease the viscosity of the formulated drug(s). Viscosity modifiers can include, but are not limited to hydroxypropyl methylcellulose, hydroxypropyl cellulose, hyaluronic acid, and combinations thereof.

The polymer used can be a bulk or viscosity modifying polymer. Such a polymer, when combined with natural aqueous materials of the tear film, can act as a mucin binding layer and can relieve irritation of corneal tissue, thus having a therapeutic effect as an active ingredient.

The composition of materials used to form the plug 6 can include a plasticizer. The plasticizer can be an OTC monograph ingredient. In some embodiments, the plasticizer can be an OTC demulcent or emollient such as, but not limited to polyethylene glycol such as polyethylene glycol 300, polyethylene glycol 400, or polyethylene glycol 6000, glycerin, mineral oil, white petroleum, white wax, paraffin, lanolin, propylene glycol, or a combination thereof.

The inclusion of a plasticizer can be used to modify material properties of the polymer, to make it more extrudable, compliant, pushable, and/or stiff as required to make the plug 6 easier to insert and place, for example, in the canaliculus via the punctum.

In some embodiments, the composition of materials used to form the plug 6 can include a phospholipid. The phospholipid can be 1,2-dimyristoyl-sn-glycero-3-phospho-rac-glycerol, sodium salt (DMPG-Na) or its associated free acid. This phospholipid ingredient may ameliorate some dry eye symptoms by mimicking the tear-film's natural lipid layer. This layer comprises the outermost section of the aqueous tear film, and slows down the evaporation of water.

In some embodiments, the plug 6 can include polyethylene glycol. That polyethylene glycol can be PEG 6000. In some embodiments, the plug 6 can include hydroxypropyl methyl cellulose. In some embodiments, the plug 6 can include a phospholipid. That phospholipid can be 1,2-dimyristoyl-sn-glycero-3-phospho-rac-glycerol.

In one embodiment, the filament includes about 10% hydroxypropyl methyl cellulose, 10% polyethylene glycol, and 80% phospholipid. In another embodiment, the filament includes about 10% hydroxypropyl methyl cellulose, 80% polyethylene glycol, and 10% phospholipid. In another embodiment, the filament includes about 80% hydroxypropyl methyl cellulose, 10% polyethylene glycol, and 10% phospholipid. In another embodiment, the filament includes about 20% hydroxypropyl methyl cellulose, 20% polyethylene glycol, and 60% phospholipid. In another embodiment, the filament includes about 20% hydroxypropyl methyl cellulose, 60% polyethylene glycol, and 20% phospholipid. In another embodiment, the filament includes about 60% hydroxypropyl methyl cellulose, 20% polyethylene glycol, and 20% phospholipid. In another embodiment, the filament includes about 40% hydroxypropyl methyl cellulose, 40% polyethylene glycol, and 20% phospholipid. In another embodiment, the filament includes about 40% hydroxypropyl methyl cellulose, 20% polyethylene glycol, and 40% phospholipid. In another embodiment, the filament includes about 20% hydroxypropyl methyl cellulose, 40% polyethylene glycol, and 40% phospholipid.

In one embodiment, the filament includes about 10% hydroxypropyl methyl cellulose, 10% PEG 6000, and 80% 1,2-dimyristoyl-sn-glycero-3-phospho-rac-glycerol. In another embodiment, the filament includes about 10% hydroxypropyl methyl cellulose, 80% PEG 6000, and 10% 1,2-dimyristoyl-sn-glycero-3-phospho-rac-glycerol. In another embodiment, the filament includes about 80% hydroxypropyl methyl cellulose, 10% PEG 6000, and 10% 1,2-dimyristoyl-sn-glycero-3-phospho-rac-glycerol. In another embodiment, the filament includes about 20% hydroxypropyl methyl cellulose, 20% PEG 6000, and 60% 1,2-dimyristoyl-sn-glycero-3-phospho-rac-glycerol. In another embodiment, the filament includes about 20% hydroxypropyl methyl cellulose, 60% PEG 6000, and 20% 1,2-dimyristoyl-sn-glycero-3-phospho-rac-glycerol. In another embodiment, the filament includes about 60% hydroxypropyl methyl cellulose, 20% PEG 6000, and 20% 1,2-dimyristoyl-sn-glycero-3-phospho-rac-glycerol. In another embodiment, the filament includes about 40% hydroxypropyl methyl cellulose, 40% PEG 6000, and 20% 1,2-dimyristoyl-sn-glycero-3-phospho-rac-glycerol. In another embodiment, the filament includes about 40% hydroxypropyl methyl cellulose, 20% PEG 6000, and 40% 1,2-dimyristoyl-sn-glycero-3-phospho-rac-glycerol. In another embodiment, the filament includes about 20% hydroxypropyl methyl cellulose, 40% PEG 6000, and 40% 1,2-dimyristoyl-sn-glycero-3-phospho-rac-glycerol.

The therapeutic agents utilized may include one or more drugs provided below, either alone or in combination. The drugs utilized may also be the equivalent of, derivatives of, or analogs of one or more of the drugs provided below.

When more than one drug is desired for treatment of a particular pathology or when a second drug is administered such as to counteract a side effect of the first drug, some embodiments may utilize two agents of the same form. In other embodiments, agents in different form may be used. Likewise, should one or more drugs utilize an adjuvant, excipient, or auxiliary compound, for example to enhance stability or tailor the elution profile, that compound or compounds may also be in any form that is compatible with the drug and can be reasonably retained with the device. In some embodiments, treatment of particular pathology with a drug released from the device may not only treat the pathology, but also induce certain undesirable side effects.

The drugs may include but are not limited to pharmaceutical agents including anti-glaucoma medications, ocular agents, antimicrobial agents, such as antibiotic, antiviral, antiparasitic, and antifungal agents, anti-inflammatory agents (including steroids or non-steroidal anti-inflammatory), biological agents including hormones, enzymes or enzyme-related components, antibodies or antibody-related components, oligonucleotides (including DNA, RNA, short-interfering RNA, antisense oligonucleotides, and the like), DNA/RNA vectors, viruses (either wild type or genetically modified) or viral vectors, peptides, proteins, enzymes, extracellular formulation components, and live cells configured to produce one or more biological components. The use of any particular drug is not limited to its primary effect or regulatory body-approved treatment indication or manner of use. Drugs also include compounds or other materials that reduce or treat one or more side effects of another drug or therapeutic agent. As many drugs have more than a single mode of action, the listing of any particular drug within any one therapeutic class below is only representative of one possible use of the drug and is not intended to limit the scope of its use with the ophthalmic device system.

As discussed above, the therapeutic agents may be combined with any number of excipients as is known in the art. In addition to the biodegradable polymeric excipients discussed above, other excipients may be used, including, but not limited to, benzyl alcohol, ethylcellulose, methylcellulose, hydroxymethylcellulose, cetyl alcohol, croscarmellose sodium, dextrans, dextrose, fructose, gelatin, glycerin, monoglycerides, diglycerides, kaolin, calcium chloride, lactose, lactose monohydrate, maltodextrins, polysorbates, pregelatinized starch, calcium stearate, magnesium stearate, silicon dioxide, cornstarch, talc, and the like. The one or more excipients may be included in total amounts as low as about 1%, 5%, or 10% and in other embodiments may be included in total amounts as high as 50%, 70% or 90%.

In some embodiments, drugs can be formulated with antimicrobial agents. Antimicrobial agents can include polaxamers. Polaxamers can be copolymers of polyoxyethylene and polyoxypropylene. In some embodiments, a poloxamer can be Poloxamer 188.

In other embodiments, antimicrobial activity can be achieved by modifying a surface of a device as described herein to resist adhesion by microbes by, for example, addition of hydrophilic or lipophilic surfaces to the device. The surface of the device may also be modified by coating with antimicrobial agents, such as silver or benzyalkonium chloride.

Examples of drugs used with plug 6 may include various anti-secretory agents; antimitotics and other anti-proliferative agents, including among others, anti-angiogenesis agents such as angiostatin, anecortave acetate, thrombospondin, VEGF receptor tyrosine kinase inhibitors and anti-vascular endothelial growth factor (anti-VEGF) drugs such as ranibizumab (LUCENTIS®) and bevacizumab (AVASTIN®), pegaptanib (MACUGEN®), aflibercept (EYLEA), sunitinib and sorafenib and any of a variety of known small-molecule and transcription inhibitors having anti-angiogenesis effect; classes of known ophthalmic drugs, including: glaucoma agents, such as adrenergic antagonists, including for example, beta-blocker agents such as atenolol propranolol, metipranolol, betaxolol, carteolol, levobetaxolol, levobunolol and timolol; adrenergic agonists or sympathomimetic agents such as epinephrine, dipivefrin, clonidine, aparclonidine, and brimonidine; parasympathomimetics or cholingeric agonists such as pilocarpine, carbachol, phospholine iodine, and physostigmine, salicylate, acetylcholine chloride, eserine, diisopropyl fluorophosphate, demecarium bromide); muscarinics; carbonic anhydrase inhibitor agents, including topical and/or systemic agents, for example acetozolamide, brinzolamide, dorzolamide and methazolamide, ethoxzolamide, diamox, and dichlorphenamide; mydriatic-cycloplegic agents such as atropine, cyclopentolate, succinylcholine, homatropine, phenylephrine, scopolamine and tropicamide; prostaglandins such as prostaglandin F2 alpha, antiprostaglandins, prostaglandin precursors, or prostaglandin analog agents such as bimatoprost, latanoprost, travoprost and unoprostone.

Other examples of drugs implemented with plug 6 may also include anti-inflammatory agents including for example glucocorticoids and corticosteroids such as betamethasone, cortisone, dexamethasone, dexamethasone 21-phosphate, methylprednisolone, prednisolone 21-phosphate, prednisolone acetate, prednisolone, fluorometholone, loteprednol, medrysone, fluocinolone acetonide, triamcinolone acetonide, triamcinolone, triamcinolone acetonide, beclomethasone, budesonide, flunisolide, fluorometholone, fluticasone, hydrocortisone, hydrocortisone acetate, loteprednol, rimexolone and non-steroidal anti-inflammatory agents including, for example, diclofenac, flurbiprofen, ibuprofen, bromfenac, nepafenac, and ketorolac, salicylate, indomethacin, ibuprofen, naxopren, piroxicam and nabumetone; anti-infective or antimicrobial agents such as antibiotics including, for example, tetracycline, chlortetracycline, bacitracin, neomycin, polymyxin, gramicidin, cephalexin, oxytetracycline, chloramphenicol, rifampicin, ciprofloxacin, tobramycin, gentamycin, erythromycin, penicillin, sulfonamides, sulfadiazine, sulfacetamide, sulfamethizole, sulfisoxazole, nitrofurazone, sodium propionate, aminoglycosides such as gentamicin and tobramycin; fluoroquinolones such as ciprofloxacin, gatifloxacin, levofloxacin, moxifloxacin, norfloxacin, ofloxacin; bacitracin, erythromycin, fusidic acid, neomycin, polymyxin B, gramicidin, trimethoprim and sulfacetamide; antifungals such as amphotericin B and miconazole; antivirals such as idoxuridine trifluorothymidine, acyclovir, gancyclovir, interferon; antimicotics; immune-modulating agents such as antiallergenics, including, for example, sodium chromoglycate, antazoline, methapyriline, chlorpheniramine, cetrizine, pyrilamine, prophenpyridamine; anti-histamine agents such as azelastine, emedastine and levocabastine; immunological drugs (such as vaccines, immune stimulants, and/or immunosuppressants); MAST cell stabilizer agents such as cromolyn sodium, ketotifen, lodoxamide, nedocrimil, olopatadine and pemirolastciliary body ablative agents, such as gentimicin and cidofovir; and other ophthalmic agents such as verteporfin, proparacaine, tetracaine, cyclosporine and pilocarpine; inhibitors of cell-surface glycoprotein receptors; decongestants such as phenylephrine, naphazoline, tetrahydrazoline; lipids or hypotensive lipids; dopaminergic agonists and/or antagonists such as quinpirole, fenoldopam, and ibopamine; vasospasm inhibitors; vasodilators; antihypertensive agents; angiotensin converting enzyme (ACE) inhibitors; angiotensin-1 receptor antagonists such as olmesartan; microtubule inhibitors; molecular motor (dynein and/or kinesin) inhibitors; actin cytoskeleton regulatory agents such as cyctchalasin, latrunculin, swinholide A, ethacrynic acid, H-7, and Rho-kinase (ROCK) inhibitors; remodeling inhibitors; modulators of the extracellular matrix such as tert-butylhydro-quinolone and AL-3037A; adenosine receptor agonists and/or antagonists such as N-6-cylclophexyladenosine and (R)-phenylisopropyladenosine; serotonin agonists; hormonal agents such as estrogens, estradiol, progestational hormones, progesterone, insulin, calcitonin, parathyroid hormone, peptide and vasopressin hypothalamus releasing factor; growth factor antagonists or growth factors, including, for example, epidermal growth factor, fibroblast growth factor, platelet derived growth factor or antagonists thereof (such as those disclosed in U.S. Pat. No. 7,759,472 or U.S. patent application Ser. Nos. 12/465,051, 12/564,863, or 12/641,270, each of which is incorporated in its entirety by reference herein), transforming growth factor beta, somatotrapin, fibronectin, connective tissue growth factor, bone morphogenic proteins (BMPs); cytokines such as interleukins, CD44, cochlin, and serum amyloids, such as serum amyloid A.

Other therapeutic agents used with plug 6 may include neuroprotective agents such as lubezole, nimodipine and related compounds, and including blood flow enhancers such as dorzolamide or betaxolol; compounds that promote blood oxygenation such as erythropoeitin; sodium channels blockers; calcium channel blockers such as nilvadipine or lomerizine; glutamate inhibitors such as memantine nitromemantine, riluzole, dextromethorphan or agmatine; acetylcholinsterase inhibitors such as galantamine; hydroxylamines or derivatives thereof, such as the water soluble hydroxylamine derivative OT-440; synaptic modulators such as hydrogen sulfide compounds containing flavonoid glycosides and/or terpenoids, such as *Ginkgo biloba*; neurotrophic factors such as glial cell-line derived neutrophic factor, brain derived neurotrophic factor; cytokines of the IL-6 family of proteins such as ciliary neurotrophic factor or leukemia inhibitory factor; compounds or factors that affect nitric oxide levels, such as nitric oxide, nitroglycerin, or nitric oxide synthase inhibitors; cannabinoid receptor agonsists such as WIN55-212-2; free radical scavengers such as methoxypolyethylene glycol thioester (MPDTE) or methoxypolyethlene glycol thiol coupled with EDTA methyl triester (MPSEDE); anti-oxidants such as astaxathin, dithiolethione, vitamin E, or metallocorroles, such as iron, manganese or gallium corroles; compounds or factors involved in oxygen homeostasis such as neuroglobin or cytoglobin; inhibitors or factors that impact mitochondrial division or fission, such as Mdivi-1 (a selective inhibitor of dynamin related protein 1 (Drp1)); kinase inhibitors or modulators such as the Rho-kinase inhibitor H-1152 or the tyrosine kinase inhibitor AG1478; compounds or factors that affect integrin function, such as the Beta 1-integrin activating antibody HUTS-21; N-acyl-ethanaolamines and their precursors, N-acyl-ethanolamine phospholipids; stimulators of glucagon-like peptide 1 receptors, such as glucagon-like peptide 1; polyphenol containing compounds such as resveratrol; chelating compounds; apoptosis-related protease inhibitors; compounds that reduce new protein synthesis; radiotherapeutic agents; photodynamic therapy agents; gene therapy agents; genetic modulators; auto-immune modulators that prevent damage to nerves or portions of nerves, like demyelination, such as glatimir; myelin inhibitors such as anti-NgR Blocking Protein, NgR(310)ecto-Fc; other immune modulators such as FK506 binding proteins, such as FKBP51; and dry eye medications such as cyclosporine, cyclosporine A, delmulcents, and sodium hyaluronate.

Other therapeutic agents that may be used with plug 6 include: other beta-blocker agents such as acebutolol, atenolol, bisoprolol, carvedilol, asmolol, labetalol, nadolol, penbutolol, and pindolol; other corticosteroidal and non-steroidal anti-inflammatory agents such aspirin, betamethasone, cortisone, diflunisal, etodolac, fenoprofen, fludrocortisone, flurbiprofen, hydrocortisone, ibuprofen, indomethacine, ketoprofen, meclofenamate, mefenamic acid, meloxicam, methylprednisolone, nabumetone, naproxen, oxaprozin, prednisolone, prioxicam, salsalate, sulindac and tolmetin; COX-2 inhibitors like celecoxib, rofecoxib and valdecoxib; other immune-modulating agents such as aldesleukin, adalimumab (HUMIRA®), azathioprine, basiliximab, daclizumab, etanercept (ENBREL®), hydroxychloroquine, infliximab (REMICADE®), leflunomide, methotrexate, mycophenolate mofetil, and sulfasalazine; other anti-histamine agents such as loratadine, desloratadine, cetirizine, diphenhydramine, chlorpheniramine, dexchlorpheniramine, clemastine, cyproheptadine, fexofenadine, hydroxyzine and promethazine; other anti-infective agents such as aminoglycosides such as amikacin and streptomycin; anti-fungal agents such as amphotericin B, caspofungin, clotrimazole, fluconazole, itraconazole, ketoconazole, voriconazole, terbinafine and nystatin; antimalarial agents such as chloroquine, atovaquone, mefloquine, primaquine, quinidine and quinine; anti-mycobacterium agents such as ethambutol, isoniazid, pyrazinamide, rifampin and rifabutin; anti-parasitic agents such as albendazole, mebendazole, thiobendazole, metronidazole, pyrantel, atovaquone, iodoquinaol, ivermectin, paromycin, praziquantel, and trimatrexate; other anti-viral agents, including anti-CMV or anti-herpetic agents such as acyclovir, cidofovir, famciclovir, gangciclovir, valacyclovir, valganciclovir, vidarabine, trifluridine and foscarnet; protease inhibitors such as ritonavir, saquinavir, lopinavir, indinavir, atazanavir, amprenavir and nelfinavir; nucleotide/nucleoside/non-nucleoside reverse transcriptase inhibitors such as abacavir, ddI, 3TC, d4T, ddC, tenofovir and emtricitabine, delavirdine, efavirenz and nevirapine; other anti-viral agents such as interferons, ribavirin and trifluridiene; other anti-bacterial agents, including cabapenems like ertapenem, imipenem and meropenem; cephalosporins such as cefadroxil, cefazolin, cefdinir, cefditoren, cephalexin, cefaclor, cefepime, cefoperazone, cefotaxime, cefotetan, cefoxitin, cefpodoxime, cefprozil, ceftaxidime, ceftibuten, ceftizoxime, ceftriaxone, cefuroxime and loracarbef; other macrolides and ketolides such as azithromycin, clarithromycin, dirithromycin and telithromycin; penicillins (with and without clavulanate) including amoxicillin, ampicillin, pivampicillin, dicloxacillin, nafcillin, oxacillin, piperacillin, and ticarcillin; tetracyclines such as doxycycline, minocycline and tetracycline; other anti-bacterials such as aztreonam, chloramphenicol, clindamycin, linezolid, nitrofurantoin and vancomycin; alpha blocker agents such as doxazosin, prazosin and terazosin; calcium-channel blockers such as amlodipine, bepridil, diltiazem, felodipine, isradipine, nicardipine, nifedipine, nisoldipine and verapamil; other anti-hypertensive agents such as clonidine, diazoxide, fenoldopan, hydralazine, minoxidil, nitroprusside, phenoxybenzamine, epoprostenol, tolazoline, treprostinil and nitrate-based agents; anti-coagulant agents, including heparins and heparinoids such as heparin, dalteparin, enoxaparin, tinzaparin and fondaparinux; other anti-coagulant agents such as hirudin, aprotinin, argatroban, bivalirudin, desirudin, lepirudin, warfarin and ximelagatran; anti-platelet agents such as abciximab, clopidogrel, dipyridamole, optifibatide, ticlopidine and tirofiban; prostaglandin PDE-5 inhibitors and other prostaglandin agents such as alprostadil, carboprost, sildenafil, tadalafil and vardenafil; thrombin inhibitors; antithrombogenic agents; anti-platelet aggregating agents; thrombolytic agents and/or fibrinolytic agents such as alteplase, anistreplase, reteplase, streptokinase, tenecteplase and urokinase; antiproliferative agents such as sirolimus, tacrolimus, everolimus, zotarolimus, paclitaxel and mycophenolic acid; hormonal-related agents including levothyroxine, fluoxymestrone, methyltestosterone, nandrolone, oxandrolone, testosterone, estradiol, estrone, estropipate, clomiphene, gonadotropins, hydroxyprogesterone, levonorgestrel, medroxyprogesterone, megestrol, mifepristone, norethindrone, oxytocin, progesterone, raloxifene and tamoxifen; anti-neoplastic agents, including alkylating agents such as carmustine lomustine, melphalan, cisplatin, fluorouracil3, and procarbazine antibiotic-like agents such as bleomycin, daunorubicin, doxorubicin, idarubicin, mitomycin and plicamycin; anti proliferative agents (such as 1,3-cis retinoic acid, 5-fluorouracil, taxol, rapamycin, mitomycin C and cisplatin); antimetabolite agents such as cytarabine, fludarabine, hydroxyurea, mercaptopurine and 5-fluorouracil (5-FU); immune modulating agents such as aldesleukin, imatinib, rituximab and tositumomab; mitotic inhibitors docetaxel, etoposide, vinblastine and vincristine; radioactive agents such as strontium-89; and other anti-neoplastic agents such as irinotecan, topotecan and mitotane.

While certain embodiments of the disclosure have been described, these embodiments have been presented by way of example only, and are not intended to limit the scope of the disclosure. Indeed, the novel methods, systems, and devices described herein may be embodied in a variety of other forms. For example, embodiments of one illustrated or described device may be combined with embodiments of another illustrated or described plug or insert. Moreover, the devices described above may be utilized for other purposes. For example, the devices may be placed in other tissues of the body where local delivery of hyaluronic acid would be beneficial. Furthermore, various omissions, substitutions and changes in the form of the methods, systems, and devices described herein may be made without departing from the spirit of the disclosure.

What is claimed is:

1. A punctum plug, wherein the punctum plug is constructed of a monolithic material comprising a high-molecular-weight polysaccharide and a plasticizer, such that the punctum plug is configured to turn approximately 90 degrees upon insertion into a canaliculus of an eye, wherein the high-molecular-weight polysaccharide includes a cellulosic polymer, and wherein the monolithic material is neither a tube nor a sleeve.

2. The punctum plug of claim 1, wherein a length of the punctum plug is greater than 5 mm.

3. The punctum plug of claim 2, wherein a diameter of the punctum plug is greater than 0.2 mm and less than 1.0 mm.

4. The punctum plug of claim 1, wherein the monolithic material is erodible in water.

5. The punctum plug of claim 1, wherein the monolithic material is erodible and configured to be flushed out a nasal passage for removal.

6. The punctum plug of claim 1, comprising of at least 50% by weight of the high-molecular-weight polysaccharide.

7. The punctum plug of claim 1, wherein the monolithic material comprises a phospholipid.

8. The punctum plug of claim 7, wherein the high-molecular-weight polysaccharide is hydroxypropyl methyl cellulose.

9. The punctum plug of claim 7, wherein the high-molecular-weight polysaccharide is carboxymethyl cellulose.

10. The punctum plug of claim 7, wherein the high-molecular-weight polysaccharide is hyaluronic acid.

11. The punctum plug of claim 7, wherein the plasticizer includes one or more of glycerin, polyethylene glycol 6000, stearic acid, lauric acid, and dimyristoylphosphatidylglycerol.

12. The punctum plug of claim 1, comprising a fluorescent moeity to improve visibility of the punctum plug during insertion.

13. The punctum plug of claim 1, comprising a fluorescent moeity to enable in situ visualization for the duration of the punctum plug.

14. The punctum plug of claim 1, configured to retain tear-film in the eye, wherein the materials erode into the tear film over a period of at least 1 month.

15. The punctum plug of claim 1, wherein the monolithic material is homogenous.

16. The punctum plug of claim 1, wherein the monolithic material further comprises an additional material comprising azelastine, emedastine, levocabastine, olopatadine and combinations thereof.

17. A punctum plug, wherein the punctum plug is constructed of an erodible monolithic material comprising a high-molecular-weight polysaccharide and a plasticizer, wherein the punctum plug is configured to be inserted into a canaliculus of an eye, wherein the high-molecular-weight polysaccharide includes a cellulosic polymer, and wherein the erodible monolithic material is neither a tube nor a sleeve.

18. The punctum plug of claim 17, wherein a length of the punctum plug is greater than 5 mm.

19. The punctum plug of claim 18, wherein a diameter of the punctum plug is greater than 0.2 mm and less than 1.0 mm.

20. The punctum plug of claim 17, wherein the monolithic material is erodible and configured to be flushed out a nasal passage for removal.

21. The punctum plug of claim 17, comprising of at least 50% by weight of the high-molecular-weight polysaccharide.

22. The punctum plug of claim 17, wherein the high-molecular-weight polysaccharide is one of hydroxypropyl methyl cellulose, carboxymethyl cellulose, and hyaluronic acid.

* * * * *